US009256421B2

(12) United States Patent
Lin et al.

(10) Patent No.: US 9,256,421 B2
(45) Date of Patent: Feb. 9, 2016

(54) METHOD, DEVICE AND TERMINAL FOR IMPROVING RUNNING SPEED OF APPLICATION

(71) Applicant: Tencent Technology (Shenzhen) Company Limited, Shenzhen Guangdong (CN)

(72) Inventors: Daozheng Lin, Shenzhen Guangdong (CN); Kefeng Nie, Shenzhen Guangdong (CN); Bin Fang, Shenzhen Guangdong (CN); Shiping Li, Shenzhen Guangdong (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 8 days.

(21) Appl. No.: 14/168,268

(22) Filed: Jan. 30, 2014

(65) Prior Publication Data
US 2014/0149972 A1    May 29, 2014

Related U.S. Application Data

(63) Continuation of application No. PCT/CN2013/072466, filed on Mar. 12, 2013.

(30) Foreign Application Priority Data

Apr. 12, 2012  (CN) .......................... 2012 1 0106766

(51) Int. Cl.
*G06F 9/445*    (2006.01)
*G06F 9/45*     (2006.01)

(52) U.S. Cl.
CPC ............... *G06F 8/67* (2013.01); *G06F 8/4441* (2013.01); *G06F 9/445* (2013.01)

(58) Field of Classification Search
None
See application file for complete search history.

(56) References Cited

U.S. PATENT DOCUMENTS 6,317,818 B1 * 11/2001 Zwiegincew et al. .......... 711/213
6,633,968 B2 * 10/2003 Zwiegincew et al. .......... 711/213
(Continued)

FOREIGN PATENT DOCUMENTS

CN    1613064 A    5/2005
CN    1652091 A    8/2005
(Continued)

OTHER PUBLICATIONS

Dunlap et al."Execution replay of multiprocessor virtual machines." Proceedings of the fourth ACM SIGPLAN/SIGOPS international conference on Virtual execution environments. ACM, 2008 Retrieved on [Sep. 25, 2015] Retrieved from the Internet: URL<http://dl.acm.org/citation.cfm?id=1346273>.*
(Continued)

*Primary Examiner* — Thuy Dao
*Assistant Examiner* — Cheneca Smith
(74) *Attorney, Agent, or Firm* — Brinks Gilson & Lione

(57) ABSTRACT

The disclosure provides a method, a device and a terminal for improving the speed of an application relating to the computer field. The method may include collecting local data information corresponding to a missing-page interruption during execution of the application. The local data information may include a name of a file in which the local data is contained, an offset in the file and the size of the local data. The method may further include acquiring the local data corresponding to the local data information in response to receiving an instruction to improve the running speed of the application and loading the acquired local data. This may reduce the time spent by the application on accessing I/O operations. Thus, the running speed of the application may be improved by loading the acquired local data according to the local data information corresponding to the missing-page interruption while the application is running.

12 Claims, 5 Drawing Sheets collect local data information corresponding to a missing-page interruption of running the application, wherein the local data information includes a name of a file in which local data is contained, an offset of the local data in the file and the size of the local data;  — 101 acquire the local data according to the local data information, and load the local data after an instruction to improve the running speed of the application is acquired;  — 102

(56) References Cited

U.S. PATENT DOCUMENTS

| | | | |
|---|---|---|---|
| 8,479,195 B2* | 7/2013 | Adams et al. | 718/1 |
| 2002/0019723 A1* | 2/2002 | Zwiegincew et al. | 702/186 |
| 2002/0135611 A1* | 9/2002 | Deosaran et al. | 345/738 |
| 2004/0098713 A1* | 5/2004 | Ogawa | G06F 8/443 717/160 |
| 2005/0081206 A1* | 4/2005 | Armstrong | G06F 11/3612 718/100 |
| 2005/0229149 A1* | 10/2005 | Munter | G06F 8/443 717/100 |
| 2008/0156355 A1 | 7/2008 | Puri | |
| 2009/0300267 A1* | 12/2009 | Schneider | 711/100 |
| 2010/0070959 A1* | 3/2010 | Altrichter | G06F 8/443 717/153 |
| 2012/0060142 A1* | 3/2012 | Fliess | G06F 8/70 717/102 |
| 2013/0205207 A1* | 8/2013 | Asch | G09B 19/0053 715/704 |

FOREIGN PATENT DOCUMENTS

| | | |
|---|---|---|
| CN | 101008922 A | 8/2007 |
| CN | 101390047 A | 3/2009 |
| CN | 101604283 A | 12/2009 |
| CN | 101689147 A | 3/2010 |
| CN | 102360345 A | 2/2012 |
| CN | 102662713 A | 9/2012 |
| WO | WO 03/083661 A1 | 10/2003 |
| WO | WO 2004/049169 A2 | 6/2004 |

OTHER PUBLICATIONS

Ganusov et al. "Future execution: A prefetching mechanism that uses multiple cores to speed up single threads." ACM Transactions on Architecture and Code Optimization (TACO) 3.4 (2006): 424-449. Retrieved on [Sep. 29, 2015] Retrieved from the Internet: URL<http://dl.acm.org/citation.cfm?id=1187979>.*

International Search Report with English translation, dated Jun. 13, 2013, pp. 1-4, International Searching Authority, State Intellectual Property Office of P.R. China, Beijing, China.

* cited by examiner

METHOD, DEVICE AND TERMINAL FOR IMPROVING RUNNING SPEED OF APPLICATION

This application is a continuation application of International Application No. PCT/CN2013/072466, titled "METHOD, APPARATUS AND TERMINAL FOR IMPROVING THE RUNNING SPEED OF APPLICATION", filed on Mar. 12, 2013, which claims priority to Chinese patent application No. 201210106766.9, titled "METHOD, DEVICE AND TERMINAL FOR IMPROVING RUNNING SPEED OF APPLICATION" and filed with the State Intellectual Property Office on Apr. 12, 2012, which is hereby incorporated by reference in its entirety.

TECHNICAL FIELD

The disclosure relates to the field of computer technology, and particularly to a method, a device and a terminal for improving running speed of an application or software.

BACKGROUND

With the rapid development of computer technology, there are several kinds of software applications. In order to satisfy execution expectations of a user for various applications, improving the execution speed, or running speed of an application may be further researched.

Typically, a pre-read mechanism and a prefetch mechanism may be used to improve the running speed of the application. In the pre-read mechanism, when a local data file is being read, contents of the file that would be required in the future may also be read into memory besides the contents currently being used. Thus, the future content may be read directly from the memory when being used, thereby reducing time spent by the application on the Input/Output (I/O). In the prefetch mechanism, main content of common applications may be read at boot time itself i.e. when an operating system is loaded. This may prevent time from being spent on reading data for the main content when the applications are started.

The pre-read mechanism may only be suitable for a scenario where the local data is accessed sequentially when the application is loaded. But for a scenario where the local data is accessed randomly during execution of the application, the pre-read mechanism may not provide significant advantages. The prefetch mechanism, though, may optimize the running speed for all applications. Thus, the prefetch mechanism may have universality, i.e. it may optimize execution of an application regardless of whether the application uses sequential or random access during I/O operations. But, the prefetch mechanism may be limited by a lack of pertinence, and may have to operate using limited optimization space to improve the running speed of the application.

SUMMARY

The present disclosure provides several embodiments to improve the pertinence of speed optimization while improving the running speed of an application, and further enhance the effect of speed improvement. The embodiments described below describe a method, a device and a terminal as a technical solution for improving running speed of an application.

In an aspect, a method for improving running speed of an application is provided. The method may include collecting local data information corresponding to a missing-page interruption while the application is running. The local data information may include a name of a file in which a local data is contained, an offset of the local data in the file and the size of the local data. The method may further include acquiring corresponding local data according to the collected local data information, and loading the acquired local data after an instruction to improve the running speed of the application is received. Collecting the local data information corresponding to a missing-page interruption while the application is running may be done by collecting a hard missing-page event and a soft missing-page event while the application is running by an event tracing mechanism, and acquiring local data information corresponding to a missing-page interruption while the application is running from an event tracing log recording the hard missing-page event and the soft missing-page event. Alternatively, collecting the local data information may be done by monitoring an underlying system call. The system call may be monitored by, what is commonly referred to as hooking. This may involve acquiring a monitoring code for recording local data information corresponding to a missing-page interruption, and acquiring, according to the monitoring code, the local data information corresponding to the missing-page interruption while the application is running.

Acquiring the corresponding local data according to the collected local data information may include the following steps. Initially, the collected local data information may be parsed to obtain the name of the file in which the local data is contained, the offset of the local data in the file and the size of the local data. The collected local data information may then be aggregated according to the name of the file in which the local data is contained. The aggregated local data information may be merged according to the offset of the local data in the file. Prefetch data information may then be selected from the merged local data information as local data information meeting a prefetch condition. The local data corresponding to the selected prefetch data information may be acquired.

Furthermore, after the selecting the prefetch data information, the method may continue by storing the selected prefetch data information along with information of the application. Loading the acquired local data may, thus, acquire the prefetch data information using the information of the application, and acquire the corresponding local data according to the prefetch data information, and load the acquired local data into a memory.

The method may also include the following steps before loading the acquired local data. An application list may be output and a user may be prompted to select an application for which running speed is to be improved from the application list. Based on the selection of the application from the application list by the user, an instruction to improve the running speed of the application along with information of the application may be received.

In another aspect, a device for improving running speed of an application may be provided. The device may include a collecting module to collect local data information corresponding to a missing-page interruption while the application is running. The local data information may include a name of a file in which local data is contained, an offset of the local data in the file and the size of the local data. An acquiring module of the device may acquire corresponding local data according to the local data information collected by the collecting module. A loading module of the device may load the local data acquired by the acquiring module in response to receipt of an instruction to improve the running speed of the application.

The collecting module of the device may collect a hard missing-page event and/or a soft missing-page event while the application is running using an event tracing mechanism. The collecting module may also acquire the local data information corresponding to the missing-page interruption while the application is running from an event tracing log recording the hard missing-page event and the soft missing-page event. Alternatively, the collecting module may monitor an underlying system call by identification of a monitoring code for recording the local data information corresponding to the missing-page interruption. The collecting module may further acquire, using the monitoring code, the local data information corresponding to the missing-page interruption while the application is running The acquiring module may further includes a parsing unit to parse the local data information collected by the collecting module to obtain the name of the file in which the local data is contained, the offset of the local data in the file and the size of the local data. An aggregating unit of the acquiring module may aggregate the collected local data information according to the name of the file in which the local data is contained that is parsed by the parsing unit. The acquiring module may further include a merging unit to merge the local data information aggregated by the aggregating unit according to the offset of the local data in the file that is parsed by the parsing unit. A selecting unit of the acquiring module may select local data information meeting a prefetch condition from the local data information merged by the merging unit as prefetch data information. An acquiring unit may then acquire corresponding local data according to the prefetch data information selected by the selecting unit.

Furthermore, the device may further include a storage module configured to store the prefetch data information selected by the selecting unit along with information of the application. The loading module of the device may further include a first acquiring unit to acquire the prefetch data information according to the information of the application. The loading module may also include a second acquiring unit to acquire corresponding local data according to the prefetch data information acquired by the first acquiring unit and a loading unit configured to load the local data acquired by the second acquiring unit into memory.

Furthermore, the device may also include an output module configured to output an application list and prompt a user to select an application for which running speed is to be improved from the application list. A receiving module of the device may receive, based on the selection of the application by the user from the application list output by the output module, an instruction to improve the running speed of the application and information of the application.

The beneficial effect of the technical solution provided in the disclosure is that by collecting the local data information corresponding to the missing-page interruption while the application is running and loading the acquired local data according to the local data information, time spent by the application on accessing I/O operations may be reduced. Thus, the running speed of the application may be improved. In addition, the effect of speed improvement may be enhanced since the local data information corresponding to the missing-page interruption may not be limited to the access scenario of the local data. Also, since the local data information corresponding to the missing-page interruption while different applications are running is different, there may be different speed optimization degrees for different applications. Thus, the pertinence of speed optimization may be improved and the speed optimization space may be expanded.

BRIEF DESCRIPTION OF THE DRAWINGS

In order to illustrate the technical solution in the embodiments, accompanying drawings are referenced as needed in the description below. The accompanying drawings are just a few of several embodiments possible. Those skilled in the art may obtain other drawings based on these accompanying drawings without any creative work.

DETAILED DESCRIPTION

Figure 1:
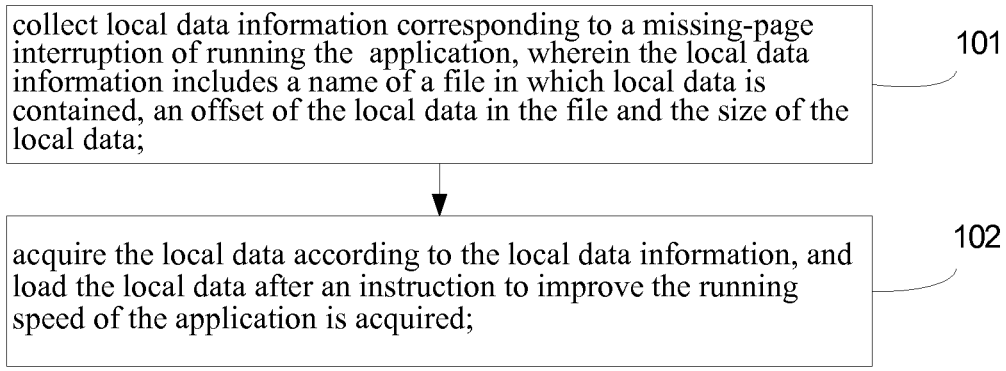
FIG. 1 is a flow chart of an example method for improving running speed of an application provided by a first embodiment.

The technical solution to improve execution speed of applications is further described using the following embodiments in conjunction with the accompanying drawings. However, the drawings are only for reference and illustration, not for limiting the invention. It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

First embodiment

This embodiment provides a method for improving running speed of an application. With reference to FIG. 1, an example flow of the method is described further.

Step 101 may involves collecting local data information corresponding to a missing-page interruption, or a missing-page interrupt, during execution of the application. An interrupt may also be referred to as an event or a page-fault. Such interrupts, or page-faults, may be raised by an operating system when an executing application encounters a missing page. The local data information may include a name of a file in which local data is contained, an offset of the local data in the file and the size of the local data, among other such information.

There may be several techniques to collect such local data information corresponding to the missing-page interruption during execution of the application. An example technique to collect the local data information may include collecting a hard missing-page event and/or a soft missing-page event while the application is running. Such events may be collected by an event tracing mechanism. The local data information corresponding to the missing-page interruption may then be acquired from an event tracing log. The log may record the hard missing-page event and the soft missing-page event. Alternatively, or in addition, the local data information may be collected by monitoring an underlying system call via hooking technique. In this technique, a monitoring code for recording local data information corresponding to the missing-page interruption may first be acquired. Further, based on the monitoring code, the local data information may be acquired.

The step 102 of the method may involve acquiring corresponding local data according to the collected local data information. The step may further load the acquired local data in response to an instruction to improve the running speed of the application.

The local data corresponding to the collected local data information may be acquired using several techniques. An example technique may include parsing the collected local data information to obtain the name of the file in which the local data is contained, the offset of the local data in the file and the size of the local data. The collected local data information may be aggregated according to the name of the file in which the local data is contained; The aggregated local data information may then be merged according to the offset of the local data in the file. The local data information meeting a prefetch condition may then be selected from the merged local data information as prefetch data information. Local data corresponding to the selected prefetch data information is then acquired.

Furthermore, after the selecting local data information meeting a prefetch condition from the merged local data information as prefetch data information, the method may further include storing the selected prefetch data information according to information of the application. Loading the acquired local data may include acquiring the prefetch data information according to the information of the application, acquiring corresponding local data according to the prefetch data information, and loading the acquired local data into memory.

Furthermore, before the loading the acquired local data, the method may further include outputting an application list, and prompting a user to select an application for which the running speed is to be improved from the application list. According to the application selected by the user from the application list, an instruction to improve the running speed of the selected application and the information of the application may be received.

By collecting the local data information corresponding to the missing-page interruption while the application is running and loading the acquired local data according to the local data information, the method provided by this embodiment may reduce the time spent by the application on accessing I/O operations. This may in turn improve the running speed of the application. In addition, the effect of speed improvement may be enhanced since the local data information corresponding to the missing-page interruption may not be limited to the access technique (sequential or random) used by the application. Further, the local data information corresponding to the missing-page interruption may be for one of several applications that may be are executing simultaneously. Thus, the several applications may experience speed optimization of varying degrees. Further yet, such optimization may be in addition to any of the previously mentioned techniques (pre-read or prefetch mechanisms) that may be employed by the applications. Therefore, the pertinence of speed optimization may be improved and the speed optimization space may be expanded.

Second embodiment

Figure 2:
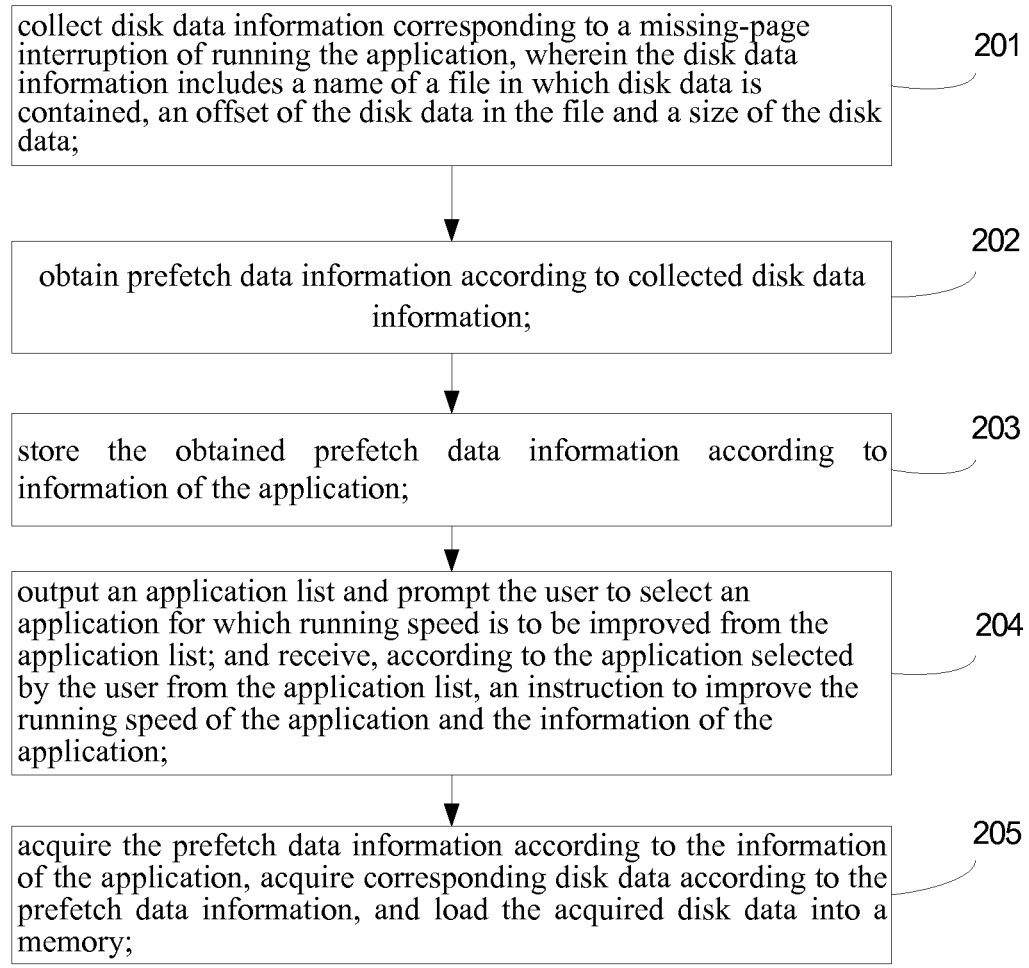
FIG. 2 is a flow chart of an example method for improving running speed of an application provided by a second embodiment.

Description of this embodiment provides a method for improving running speed of an application. The method may involve collecting local data information corresponding to a missing-page interruption while the application is running and loading corresponding local data according to prefetch data information. After the prefetch data information is obtained, by training the local data information, the time spent by the application on accessing I/O operations may be reduced. This is because that the application may find a more efficient way to obtain the data information after training the local data information. Thus, the running speed of the application may be improved. In conjunction with the description of the first embodiment earlier, the second embodiment is described by taking an example case that the local data is disk data. FIG. 2 provides an example flow of the method provided by this embodiment as described further.

Step 201 may involve collecting disk data information corresponding to the missing-page interruption while the application is running. The disk data information may include a name of a file in which disk data is contained, an offset of the disk data in the file and the size of the disk data.

The missing-page interruption may refer to a page of data to be accessed which is not in memory, and there is a need for an operating system to call the page into the memory for access. The missing-page interruption may include a hard missing-page and/or a soft missing-page. The hard missing-page interruption may be issued when the data needed is neither in a cache nor in a paged memory, and there is a need to acquire the disk data from a disk through I/O operations. The soft missing-page interruption may be issued when the data needed has been loaded into the memory and then is displaced into a disk. Therefore, in case of the soft missing-page interruption, the content may be reloaded from a disk swap file to the memory. Thus, regardless of the type of the missing-page interruption, the missing-page interruption will influence on the running speed of an application, and typically slow the application. Hence, to improve the running speed of the application, this embodiment may collect disk data information corresponding to the missing-page interruption while the application is running. The disk data acquired according to the disk data information may be preloaded in a subsequent step, to avoid occurrence of the missing-page interruption. Consequently, the running speed of the application may be improved. There may be several ways to collect the disk data information corresponding to the missing-page interruption while the application is running. Two example ways are described below. The disclosure is not limited to the following two ways, as the other techniques would be obvious to a person skilled in the art based on the present disclosure.

In a first example, a hard missing-page event and/or a soft missing-page event while the application is running may be collected using an event tracing mechanism. The disk data information corresponding to the missing-page interruption while the application is running may then be acquired from an event tracing log recording the hard missing-page event and the soft missing-page event.

For example, the event tracing mechanism may employ Event Tracing for Windows (ETW). The ETW is a universal event tracing approach that is provided by an operating system and has less system overhead compared with a performance log and a warning, and is used for monitoring performance of a system. The ETW is typically applied to a server application for recording an event, an error, a warning or an examination. The ETW provides an event tracing mechanism that may be triggered by an application in a user mode or an equipment driver in a kernel mode. Further, the ETW may also dynamically enable or disable a log record to perform a detailed tracing without restarting the operating system or the application. Therefore, the hard missing-page event and the soft missing-page event while the application is running may be collected by the ETW, and disk data information corresponding to the missing-page interruption while the application is running can be acquired from an event trace log recording the hard missing-page event and the soft missing-page event.

In a second example, monitoring an underlying system call by a hook may be employed. This may involve acquiring a monitoring code for recording disk data information corresponding to the missing-page interruption. The disk data information corresponding to the missing-page interruption may be acquired, according to the monitoring code, while the application is running.

For example, hooking may be a message processing mechanism provided by an operating system, such as WINDOWS, to intercept function calls, messages, or events passed between software components executing in the operating system. The code, program, or set of instructions, that handle such interceptions is commonly referred to as a 'hook'. The hook may monitor and intercept various messages in a system or a process. After intercepting a message sent to a target window, the hook may process the message, or continue to deliver the message without any processing, or force the delivery of the message to the destination. Thus, the underlying system call may be monitored by using the hook, or by hooking. Once the monitoring code for recording the disk data information corresponding to the missing-page interrupt is obtained, the disk data information corresponding to the missing-page interrupt while the application is running may be acquired using to the monitoring code.

As indicated earlier, other ways to collect the disk data information, other than the two collection ways described above, may be used. Regardless of which way is employed, after being collected, all the disk data information corresponding to the missing-page interruption while the application is running may be converted to text data. The text data may be stored in a disk content description format, such as <file, offset, length>. Here, the "file" may be a name of a file in which the disk data is contained, the "offset" may be an offset of the disk data in the file, and the "length" may be the size of the disk data and may be indicated in bytes.

Step 202 may include obtaining prefetch data information according to the collected disk data information.

The prefetch data information according to collected disk data information may include at least the following steps. The collected disk data information may be parsed to obtain the name of the file in which the disk data is contained, the offset of the disk data in the file and the size of the disk data. The collected disk data information may be aggregated according to the name of the file in which the disk data is contained. The aggregated disk data information may be then merged according to the offset of the disk data in the file, and disk data information from the merged disk data information may be selected as prefetch data information if the disk data information meets a prefetch condition.

Parsing the collected disk data information may be achieved by several possible parsing techniques. For ease of explanation of the embodiment, one illustration of parsed disk data information is shown in Table 1 below.

TABLE 1

| File | Offset | Length (bytes) |
|---|---|---|
| Example1.dll | 0 | 1024 |
| Example2.dll | 4096 | 512 |
| Example3.data | 0 | 10240 |
| Example1.dll | 1024 | 1024 |
| Example2.dll | 0 | 512 |

Table 1 illustrates 5 pieces of disk data information that are parsed. The collected disk data information may be aggregated according to the name of the file in which the disk data is contained. Thus, the disk data information with the same file name may be aggregated together. For example, two pieces of disk data information with a file name of Example1.dll may be aggregated, and two pieces of disk data information with a file name of Example2.dll may be aggregated. The obtained aggregation result is shown in Table 2 below.

TABLE 2

| File | Offset | Length (bytes) |
|---|---|---|
| Example1.dll | 0 | 1024 |
|  | 1024 | 1024 |
| Example2.dll | 0 | 512 |
|  | 4096 | 512 |
| Example3.data | 0 | 10240 |

The aggregated disk data information may be, then, merged according to the offset of the disk data in the file, in conjunction with the aggregation result shown in Table 2. The disk data information corresponding to the same file may be merged according to whether a distance between offsets thereof is within a preset range. Specifically, the preset range may be set as 1024, 2056 or any other predetermined range. In this example, assume that the preset range is 2056. For the two pieces of disk data information with the file name of Example2.dll, as shown in Table 2, the offset of one piece of disk data information is 0, and the offset of the other piece of disk data information is 4096. Therefore, the distance between the offsets of the two pieces of disk data information is 4096. Thus, the distance between the two pieces of disk data information is beyond the preset range 2056. Hence, the two pieces of disk date information may not be merged, in this example.

However, for the two pieces of disk data information with the file name of Example1.dll, as shown in Table 2, the offset of one piece of disk data information is 0, and the offset of the other piece of disk data information is 1024. Therefore, the distance between the offsets of the two pieces of disk data information is 1024, which is within the preset range 2056. Hence, in this example, the two pieces of disk data information may be merged. The merged result is shown in Table 3.

TABLE 3

| File | Offset | Length (bytes) |
|---|---|---|
| Example1.dll | 0 | 2048 |
| Example2.dll | 0 | 512 |
|  | 4096 | 512 |
| Example3.data | 0 | 10240 |

With the above aggregating and merging processes, the result exemplified in Table 3 may be obtained each time the application is run. The prefetch data information may be obtained by collecting the disk data information corresponding to the missing-page interruption while the application is being executed. If the application, upon execution several times illustrates the same pattern, the system may be trained for the collected result. Similar to reading the disk data information, the prefetch data information may be used to record disk data information of the application which is likely to be acquired through I/O accessing. Different applications correspond to different prefetch data information. Even the same application may prefetch different data information under different scenarios. Such scenarios may include but are not limited to loading and running. If it is determined that the application is likely to acquire the disk data through I/O access, under a particular scenario, then disk data information may be collected for use under that particular scenario. Corresponding prefetch data information may then be obtained based on the collected disk data information and according to the above process, the corresponding disk data may be further acquired using the prefetch data information.

Additionally, or alternatively, the result shown above in Table 3 may be obtained each time the application is run. If the result as shown above in Table 3, which is obtained each time the application is run, is merged, and the merged result is used directly as the obtained prefetch data information, then the range of the disk data covered by the prefetch data information may be wider. However, some disk data may not frequently used while the application is running and only that the disk data information corresponding to the disk data being used by the application has been collected in the collecting step. Therefore, loading such disk data may not assist in improving the running speed of the application, but instead may occupy system resources. Hence, the range of disk data covered by the prefetch data information on a premise of improving the running speed of the application may have to be narrowed. This may reduce loading of unnecessary disk data and thereby prevent a waste of resources. The method provided by this embodiment may adopts the following steps to achieve such optimizations. After the merged disk data information is obtained through the above process, instead of using all the merged disk data information as the prefetch data information directly, only the disk data information meeting a prefetch condition may be selected from the merged disk data information. The selected disk data information may then be used as the prefetch data information.

The prefetch condition may be based on the number of times that the disk data information is collected. The prefetch condition may be to determine whether the number of times reaches a preset number. For example, if a piece of disk data information is collected only once during a process in which the collection is performed ten times, it may be concluded that the collecting frequency of the piece of disk data information is low. That is, a requirement for disk data corresponding to the piece of disk data information during execution of the application may be not high. Hence, the piece of disk data information may be deleted from the collected disk data information. Conversely, if a piece of disk data information is collected six times out of the ten times that the process is performed, then it may be concluded that the collecting frequency of the piece of disk data information is high. That is, requirement for the disk data corresponding to the piece of disk data information during execution of the application may be relatively high. Hence, the piece of disk data information may be retained in the collected disk data information. What is described is just one of several possible prefetch conditions that may be employed for determining whether the merged disk data information may be retained. Other such prefetch conditions may also be selected. Neither the preset number nor the prefetch condition is limited in this embodiment.

Step 203 may involve storing the obtained prefetch data information according to information of the application.

Even in case the user does not have to run the application, and/or the user chooses not to run the application in order to avoid occupation of the system resources used by loading the disk data corresponding to the application, the method may provide a way that to perform step 203. In this case, after the prefetch data information is obtained, instead of directly loading the disk data acquired based on the prefetch data information, whether to load the disk data acquired based on the prefetch data information may be determined according to a user's requirement for running the application. The obtained prefetch data information may be stored according to the information of the application so that each application may be trained to obtain corresponding prefetch data information. In order to distinguish the prefetch data information of different applications, respective prefetch data information may be stored according to the information of each application. The information of the application may include but is not limited to a name, a path, a version number and so on of the application. The information of the application may include several other fields other than those listed above.

The obtained prefetch data information may be stored locally or on a network. The information may also be stored locally and on the network. The storage location and storage way may not be limited to a particular way in this embodiment.

Step 204 may involve outputting an application list, and prompting the user to select an application for which running speed is to be improved from the application list. Upon selection of the application, by the user, from the application list, an instruction to improve the running speed of the selected application and the information of the application may be received.

The application list may contain only a name of the application, or the name of the application along with an icon of the application together. The application list may be output in several ways and the content of the application list may also be presented to the user in several different ways. The application list may be output to prompt the user to select an application for which running speed is to be improved so as to realize a purpose of improving the running speed of each application. For example, the prefetch data information of ten applications may be obtained and stored through the above steps 201 to 203. However, not all ten applications may be executing at a given time. Therefore, in order to avoid a waste of the system resources caused by loading the disk data of the ten applications simultaneously, this embodiment may adopt the user selection to load only the required disk data separately. If an application is selected by the user from the application list, then it means that the user desires to improve the running speed of the application. Sending the instruction to improve the running speed of the application along with the information of the application may be triggered when the application is selected by the user from the application list. This in turn may trigger the subsequent step to load the corresponding disk data according to the instruction and the information. The information of the application may refer to information of the application selected by the user.

Step 205 may involve acquiring the prefetch data information according to the information of the application, acquiring corresponding disk data according to the prefetch data information, and further loading the acquired disk data into memory.

Regardless of whether the prefetch data information is stored locally or on the network in the above step 203, since it is stored according to the information of the application, there may be a relationship between each of the prefetch data information and the corresponding information of the application. After the information of the application is acquired in the above step 204, corresponding prefetch data information may be acquired according to the information of the application. Since disk data information is recorded in the prefetch data information, corresponding disk data may be acquired according to the prefetch data information.

The acquired disk data may be loaded into the memory not only while the system is idle but also while the application is running. The time at which the disk data is loaded is not limited in this embodiment. In case the acquired disk data is loaded while the system is idle, first, a determination may be made whether the disk data to be loaded is present in the memory. If the disk data is present in the memory, the disk data may not be loaded into a cache. Instead, if the disk data is not present in the memory, the disk data may be loaded into the cache. Correspondingly, in case the acquired disk data is loaded when the application is started, first it may be determined whether the application is started. If the application is started, then the acquired disk data is loaded. Instead, if the application is not started, the acquired disk data may not be loaded. Regardless of whether the acquired disk data is loaded while the system is idle or when the application is started, the loading process may be realized by referring to the existing loading flow. There may be other ways to load the data other than those described here. What is described is just one example of this step.

By collecting the local data information corresponding to the missing-page interruption while the application is running and loading the acquired local data according to the local data information, the method provided by this embodiment may reduce the time spent by the application on accessing I/O operations. Thus, the running speed of the application may be improved. In addition, the effect of speed improvement may be enhanced, since the local data information corresponding to the missing-page interruption may not be limited to the access scenario of the local data. Further, since the local data information corresponding to the missing-page interruption may be different for the different applications that may be running, speed optimization may vary for the different applications. The pertinence of speed optimization may, thus, be improved and the speed optimization space expanded.

Third embodiment

Figure 3:
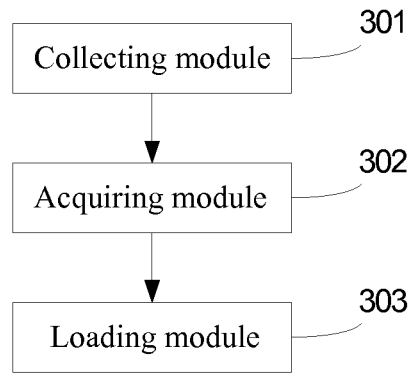
FIG. 3 is a schematic structural diagram of an example device for improving running speed of an application provided by a third embodiment.

With reference to FIG. 3, this embodiment of the invention provides a device for improving running speed of an application. The device may include a collecting module 301, an acquiring module 302, and a loading module 303.

The collecting module 301 may collect local data information corresponding to a missing-page interruption while the application is running. The local data information may include a name of a file in which local data is contained, an offset of the local data in the file and the size of the local data among other local data information.

The acquiring module 302 may acquire corresponding local data according to the local data information collected by the collecting module 301.

The loading module 303 may load the local data acquired by the acquiring module 302 in response to an instruction to improve the running speed of the application.

The collecting module 301 may collect a hard missing-page event and/or a soft missing-page event while the application is running by an event tracing mechanism. The local data information corresponding to a missing-page interruption while the application is running may then be acquired by the collecting module 301 from an event tracing log recording the missing-page event. Alternatively, or in addition, the collecting module 301 may monitor underlying system call using a hook. The collecting module 301 may acquire a monitoring code for recording local data information corresponding to the missing-page interruption. The collecting module 301 may then acquire the local data information corresponding to the missing-page interruption while the application is running using the monitoring code.

The collecting module 301 may collect local data information corresponding to a missing-page interruption while the application is running similar to the description of step 201 of the second embodiment above.

Figure 4:
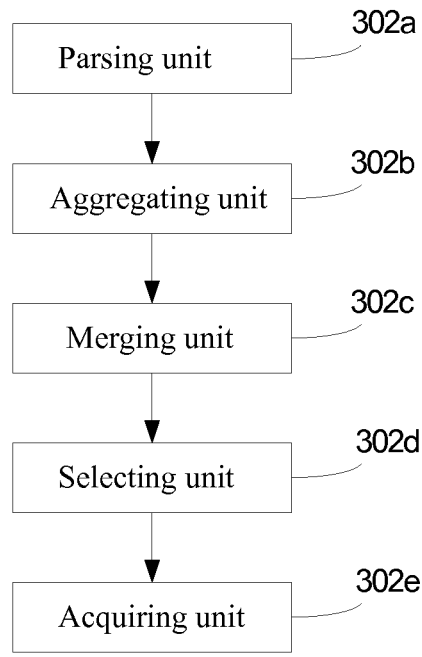
FIG. 4 is a schematic structural diagram of an example acquiring module provided by a third embodiment.

An example of the acquiring module 302, further illustrated in FIG. 4, may include a parsing unit 302a, an aggregating unit 302b, a merging unit 302c, a selecting unit 302d, and an acquiring unit 302e. The acquiring module 302 in other example embodiments may include fewer or more components.

The parsing unit 302a may parse the local data information collected by the collecting module 301. As a result, the name of the file in which the local data is contained, the offset of the local data in the file and the size of the local data may be obtained.

The aggregating unit 302b may aggregate the collected local data information according to the name of the file in which the local data is contained that is parsed by the parsing unit 302a.

The merging unit 302c may merge the local data information aggregated by the aggregating unit 302b according to the offset of the local data in the file that is parsed by the parsing unit 302a.

The selecting unit 302d may select, as the prefetch data information, part of the local data information from the local data information merged by the merging unit 302c. The selection may be done based on the part of the local data information meeting a prefetch condition.

The acquiring unit 302e may acquire corresponding local data according to the prefetch data information selected by the selecting unit 302d.

The parsing unit 302a, the aggregating unit 302b, the merging unit 302c, and the selecting unit 302d, may operate according to the description of step 202 of the above second embodiment. Hence, details of the operation are not repeated here any more.

Figure 5:
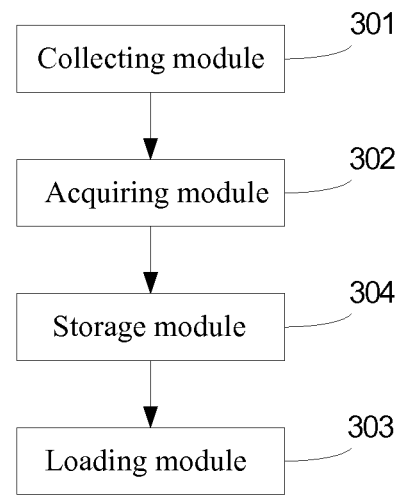
FIG. 5 is a schematic structural diagram of another example device for improving running speed of an application provided by a third embodiment.

Another example of the device, as shown in FIG. 5, may further include a storage module 304 to store the prefetch data information selected by the selecting unit 302d according to information of the application.

Figure 6:
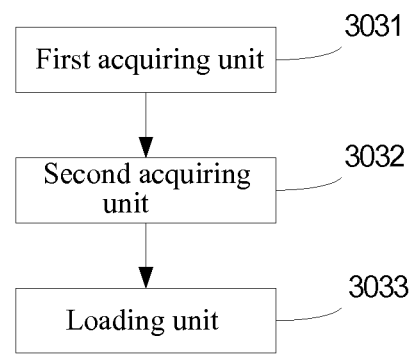
FIG. 6 is a schematic structural diagram of an example loading module provided by a third embodiment.

Additionally, or alternatively, as shown in FIG. 6, the loading module 303 may include a first acquiring unit 3031, a second acquiring unit 3032, and a loading unit 3033. The first acquiring unit 3031 may acquire the prefetch data information stored by the storage module 304 according to the information of the application. The second acquiring unit 3032 may acquire corresponding local data according to the prefetch data information acquired by the first acquiring unit 3031. The loading unit 3033 may load the local data acquired by the second acquiring unit 3032 into memory.

The storage module 304 may store the prefetch data information as described in step 203 of the above second embodiment, and is not repeated here. The first acquiring unit 3031 may acquire the prefetch data information, the second acquiring unit 3032 may acquire the local data, and the loading unit 3033 may load the local data similar to the description in step 205 of the above second embodiment, which is not repeated here.

Figure 7:
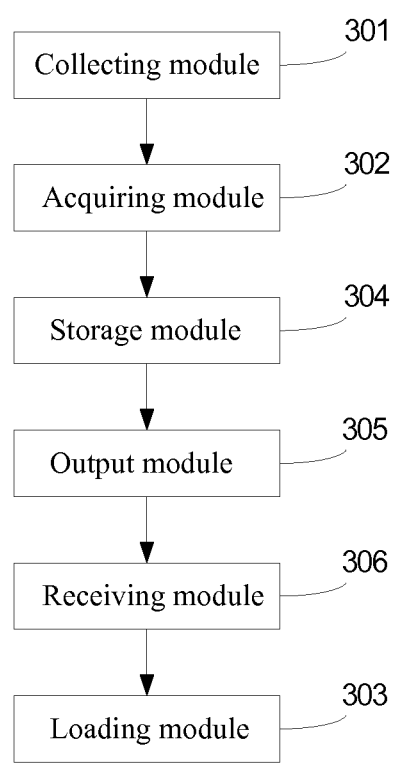
FIG. 7 is a schematic structural diagram of another example device for improving running speed of an application provided by a third embodiment.

In yet another example of the embodiment, as shown in FIG. 7, the device may further include an output module 305 and a receiving module 306. The output module 305 may output the application list and prompt a user to select an application for which running speed is to be improved from the application list. The receiving module 306 may receive, in response to the application selected by the user from the application list, an instruction to improve the running speed of the selected application and the information of the application.

The output module 305 may output the application list and the receiving module 306 may receive the instruction to improve the running speed of the application and the information of the application similar to the description in step 204 of the above second embodiment, which is not repeated here.

By collecting the local data information corresponding to the missing-page interruption while the application is running and loading the acquired local data according to the local data information, the device provided by this embodiment may reduce the time spent by the application on accessing I/O operations. Thus, the running speed of the application may be improved. The effect of speed improvement may be enhanced further since the local data information corresponding to the missing-page interruption is not limited to the access scenario of the local data (i.e. sequential or random access). Since the local data information corresponding to the missing-page interruption while different applications are running may be different for different applications, the execution speed of the different applications may be optimized by varying degrees. Hence, the pertinence of speed optimization may be improved and the speed optimization space may be expanded.

Fourth embodiment

Figure 8:
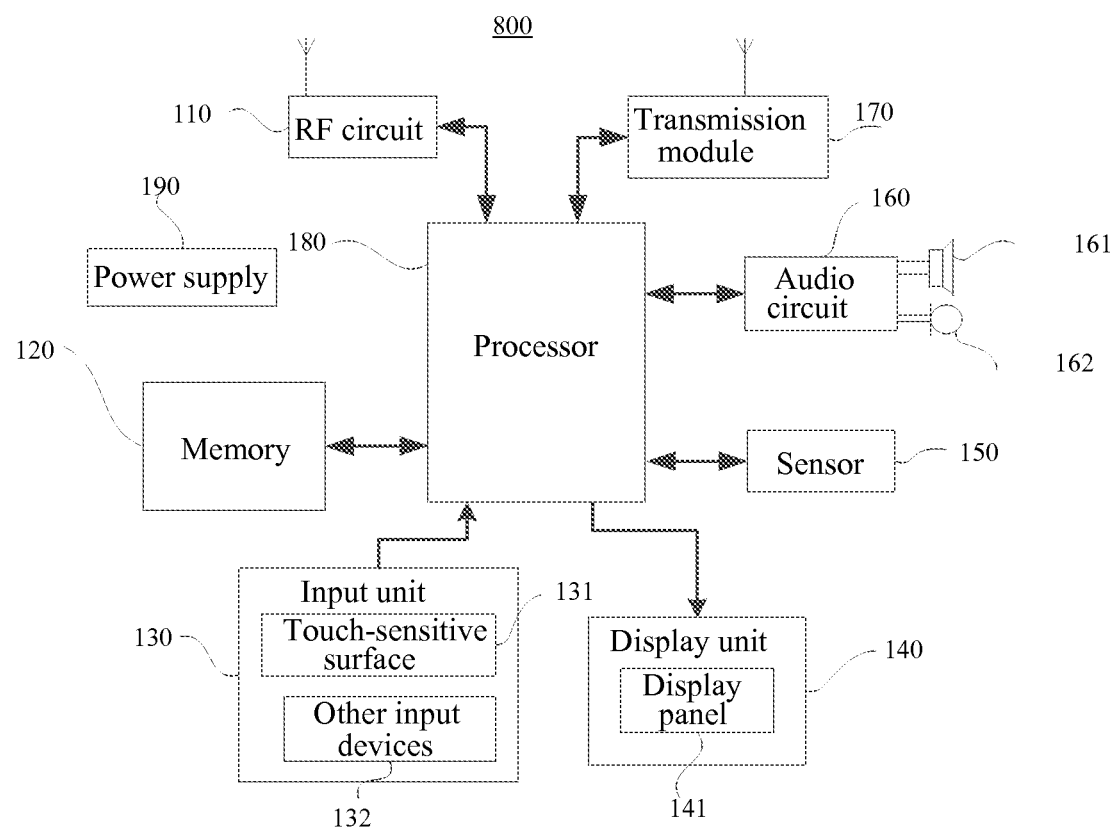
FIG. 8 is a schematic structural diagram of an example terminal provided by a fourth embodiment.

Yet another embodiment optimizing the execution speed of an application may be a terminal as illustrated in FIG. 8. FIG. 8 shows a schematic structural diagram of an example terminal having a touch-sensitive surface. The terminal may be used for improving the running speed of an application.

The terminal 800 may include components such as a Radio Frequency (RF) circuit 110, a memory 120 including one or more computer readable storage mediums, an input unit 130, a display unit 140, a sensor 150, an audio circuit 160, a transmission module 170, a processor 180 including one or more processing cores, and a power supply 190. It should be understood by those skilled in the art that the terminal is not limited to having the terminal structure shown in FIG. 8, and may include more or less components than those illustrated. Other embodiments may include a different combination of the components or a different arrangement of the components.

The RF circuit 110 may be used to receive and send information, or receive or send a signal during a call. Specifically, the RF circuit 110 may receive downlink information from a base station, and deliver the received information to one or more processors 180 for further processing. In addition, the RF circuit 110 may send uplink data to the base station. Generally, the RF circuit 110 may include, but is not limited to, an antenna, at least one amplifier, a tuner, one ore more oscillators, a Subscriber Identity Module (SIM) card, a transceiver, a coupler, a Low Noise Amplifier (LNA), a duplexer and other such components used for communication of data. Furthermore, the RF circuit 110 may also communicate with a network or other devices via wireless communication. The wireless communication may employ any communication standard or protocol, including but not limit to Global System of Mobile communication (GSM), General Packet Radio Service (GPRS), Code Division Multiple Access (CDMA), Wideband Code Division Multiple Access (WCDMA), Long Term Evolution (LTE), e-mail, Short Messaging Service (SMS) and various other wireless communication modes.

The memory 120 may be used to store software programs and modules. For example, the memory may store a software program and module corresponding to the device for improving the running speed of an application described above in the third embodiment. The processor 180 may perform various functions of the application and process data. For example, the processor 180 may perform operations involved in improving the running speed of the application by running the software programs and modules stored in the memory 120. The memory 120 may include a program memory area and a data memory area. The program memory area may store an operating system. The program memory area may also store an application required by at least one function, such as a sound playing function, an image rendering function, and any other function. The data memory area may store data, such as audio data, phone book, or any other data created or used by a used of the terminal 800. Furthermore, the memory 120 may include a high speed random access memory, and may also include one or more non-volatile memory such a magnetic disk memory device, a flash memory device or other volatile solid state memory devices. The memory 120 may also include a memory controller for providing the processor 180 and the input unit 130 access to the memory 120.

The input unit 130 may be used to receive input information or character information, and generate a keyboard signal input, a mouse signal input, a joystick signal input, optical signal input or a trackball signal input related to user settings and function control. The input unit 130 may include a touch-sensitive surface 131 and/or other input devices 132. The touch-sensitive surface 131, which may also be referred to as a touch display screen or a touch panel, may collect touch operations. Touch operations may include, for example, operations on the touch-sensitive surface 131 or near the touch-sensitive surface 131 initiated by the user. The operations may be performed using any suitable object or accessory, such as a finger and/or a touch pen. Such operations on or about the touch-sensitive surface 131, made by the user, may drive a corresponding connection device according to a preset program. Additionally, or alternatively, the touch-sensitive surface 131 may include a touch detection device and a touch controller. The touch detection device may detect a touch by the user and a signal caused by the touch operation. The touch detection device may then communicate the signal to the touch controller. The touch controller may receive touch information from the touch detection device and convert the touch information into contact coordinates. The contact coordinates may be then communicated to the processor 180. In addition, the touch controller may also receive a command sent from the processor 180. Furthermore, the touch-sensitive surface 131 may be a resistive, a capacitive, an infrared, and/or a surface acoustic wave type surface. The touch-sensitive surface 131 may also be implemented using a combination of the above techniques. In addition to the touch-sensitive surface 131, the input unit 130 may also include other input devices 132. The other input devices 132 may include but are not limited to one or more of a keyboard, a function key (such as a volume control button and a switch button), a trackball, a mouse, a joystick and various other input devices.

The display unit 140 may be used to display information input by the user, information provided to the user and various graphic user interfaces of the terminal 800. The graphic user interfaces may be composed of a graphic, a text, an icon, a video or any combination thereof The display unit 140 may include a display panel 141. The display panel 141 may be, for example, a Liquid Crystal Display (LCD), an Organic Light-Emitting Diode (OLED) or any other type of display panel. Furthermore, the touch-sensitive surface 131 may cover the display panel 141. When the touch-sensitive surface 131 detects a touch operation thereon or thereabout, the touch-sensitive surface 131 may send the touch operation to the processor 180 to determine a type of the touch event. The processor 180 may provide a corresponding visual output on the display panel 141 according to the type of the touch event. Although the touch-sensitive surface 131 and the display panel 141 are shown as two separate components for realizing an input function and an output function in FIG. 8, in some example embodiments, the touch-sensitive surface 131 and the display panel 141 may be integrated together to realize the input function and the output function.

The terminal 800 may also include at least one sensor 150, such as a light sensor, a motion sensor, gravity acceleration sensor, or any other sensor. The light sensor may be an ambient light sensor and/or a proximity sensor. The ambient light sensor may adjust brightness of the display panel 141 according to the intensity of ambient light. The proximity sensor may turn off the display panel 141 and/or a backlight when the terminal 800 moves close to the user's ear. A gravity acceleration sensor may detect a magnitude of acceleration in each direction (generally, along three axes). The gravity acceleration sensor may also detect the magnitude and direction of gravity in a stationary state. Such sensor information may be used by an application for identifying an attitude, or orientation of a mobile phone. For example, such information may be used to switch between a landscape mode and a portrait mode, when executing related games, and magnetometer attitude calibration. A function related to vibration identification may also be used for applications such as a pedometer and/or to detect a tap and various other functions. Other sensors, such as a gyroscope, a barometer, a hygrometer, a thermometer, an infrared sensor, may also be equipped with the terminal 800, are not described in detail here.

An audio interface between the user and the terminal 800 may be provided by the audio circuit 160, a loudspeaker 161, and a microphone 162. The audio circuit 160 may convert the received audio data into an electrical signal to transmit the electrical signal to the loudspeaker 161. The loudspeaker 161 may convert the electrical signal into a sound signal to output. On the other hand, the microphone 162 may convert the collected sound signal into an electrical signal and send the electrical signal to the audio circuit 160. The audio circuit 160 may convert the received electrical signal into audio data and then output the audio data to the processor 180. The processor 180, in turn, may process the audio data, and may send the processed audio data to, for example, another terminal via the RF circuit 110. Alternatively, or in addition, the processor may output the processed audio data to the memory 120 to perform further processing. The audio circuit 160 may also include an earphone jack to provide communication between a peripheral earphone and the terminal 800.

The terminal 800 may assist the user in sending and receiving an e-mail, browsing a webpage and accessing a streaming media and perform other communication and/or entertainment activities using the transmission module 170. The transmission module 170 may provide wireless or wired broadband internet access to the user. Although the transmission module 170 is illustrated in FIG. 8, other embodiments of the terminal 800 may omit the transmission module 170.

The processor 180, which may be considered as a control center of the terminal 800, may be used to connect all parts of a cell phone by utilizing various interfaces and lines. This may enable the processor 180 to perform various functions of the terminal 800 and process data by running or executing the software programs and/or modules stored in the memory 120.

The processor 180 may also access data stored in the memory 120. Thus, the processor 180 may monitor the entire operation of the cell phone. The processor 180 may include one or more processing cores. Alternatively, or in addition, an application processor and a modem processor may be integrated into the processor 180, such that the application processor may primarily process an operating system, a user interface, an application and other functionality, while the modem processor may primarily process wireless communication. In another embodiment, the modem processor described above may not be integrated into the processor 180.

The terminal 800 may further include the power supply 190 (e.g. a battery) for providing power for individual components. The power supply may be logically connected to the processor 180 via a power supply management system to achieve functions, such as charge management, discharge management and power consumption management. The power supply 190 may further include one or more DC power supply and/or AC power supply, a recharge system, a power supply fault detection circuit, a power supply converter or inverter, a power supply state indicator and other such components.

Although not illustrated, the terminal 800 may also include a camera, a Bluetooth module and other peripherals which are not described here. In one embodiment, the display unit of the terminal may be a touch-screen display, and the terminal may further include a memory and one or more programs stored in the memory. The one or more processors may be configured to perform instructions which are included in the one or more programs to implement the operations such as those described further. An operation may be collecting local data information corresponding to a missing-page interruption while an application is running. The local data information may include a name of a file in which local data is contained, an offset of the local data in the file and the size of the local data. Another operation may be acquiring local data corresponding to the collected local data information, and loading the acquired local data in response to receipt of an instruction to improve the running speed of the application.

Provided that the above description is referred to as a first possible embodiment, in a second possible embodiment provided on the basis of the first possible embodiment, the memory of the terminal may further include instructions to perform the following operations. The instructions may be for collecting a hard missing-page event and/or a soft missing-page event while the application is running by an event tracing mechanism. Further, local data information corresponding to the missing-page interruption may be obtained, while the application is running, from an event tracing log recording the missing-page event. The instructions may also be for monitoring an underlying system call by a hook. Further, a monitoring code for recording local data information corresponding to the missing-page interruption may be acquired. Further yet, using to the monitoring code, the local data information corresponding to the missing-page interruption may be obtained, while the application is running.

In a third possible embodiment provided on the basis of the first possible embodiment, the memory of the terminal may further include instructions to parse the collected local data information to obtain the name of the file in which the local data is contained, the offset of the local data in the file and the size of the local data. Instructions may also be provided to aggregate the collected local data information according to the name of the file in which the local data is contained. Further instructions may be included to merge the aggregated local data information according to the offset of the local data in the file, and select local data information meeting a prefetch condition from the merged local data information as prefetch data information. Further yet, instructions to acquire corresponding local data according to the selected prefetch data information may be provided.

In a fourth possible embodiment provided on the basis of the third possible embodiment, the memory of the terminal may further include instructions to store the selected prefetch data information according to information of the application. Instructions may also be included to load the acquired local data by acquiring the prefetch data information according to the information of the application, acquiring corresponding local data according to the prefetch data information, and loading the acquired local data into memory.

In a fifth possible embodiment provided on the basis of the first possible embodiment, the second possible embodiment, the third possible embodiment and the fourth possible embodiment, the memory of the terminal further may include instructions to perform the operation to output an application list, and prompt a user to select an application for which running speed is to be improved from the application list. Further instructions may receive, based on the application selected by the user from the application list, an instruction to improve the running speed of the application and the information of the selected application.

Thus, by collecting the local data information corresponding to the missing-page interruption while the application is running and loading the acquired local data according to the local data information, the terminal provided by this embodiment may reduce the time spent by the application on accessing I/O operations, Consequently, the running speed of the application may be improved. In addition, the effect of speed improvement mechanisms such as prefetch and pre-read may be enhanced since the local data information corresponding to the missing-page interruption may not be limited to the access scenario of the local data. Also, since the local data information corresponding to the missing-page interruption may be different while different applications are running, there may be different speed optimization degrees for different applications. Thus, the pertinence of speed optimization may be improved and the speed optimization space may be expanded.

Fifth embodiment

In this embodiment, a computer readable storage medium is provided. The computer readable storage medium may be the computer readable storage medium included in the memory in the embodiment described above, or may be a separate computer readable storage medium not equipped into the terminal One or more programs may be stored in the computer readable storage medium which may be used by one or more processors to perform a slide control method having less fluctuation than that of other embodiments. The method may include collecting local data information corresponding to a missing-page interruption while an application is running. The local data information may include a name of a file in which local data is contained, an offset of the local data in the file and the size of the local data. The method may further include acquiring local data corresponding to the collected local data information, and loading the acquired local data in response to an instruction to improve the running speed of the application.

Provided that the above description is referred to as a first possible embodiment, in a second possible embodiment provided on the basis of the first possible embodiment, the collecting local data information corresponding to a missing-page interruption while an application is running may include collecting a hard missing-page event and a soft missing-page event while an application is running. The missing-page event may be collected by an event tracing mechanism. The method may further include acquiring local data information corresponding to the missing-page interruption while the application is running using an event tracing log. The log may record the hard missing-page event and the soft missing-page event. Alternatively, or in addition, the method may include monitoring an underlying system call using a hook. This may further involve acquiring a monitoring code for recording local data information corresponding to the missing-page interrupt, and acquiring, according to the monitoring code, the local data information corresponding to the missing-page interrupt while the application is running In a third possible embodiment provided on the basis of the first possible embodiment, the acquiring corresponding local data according to the collected local data information may include parsing the collected local data information to obtain the name of the file in which the local data is contained, the offset of the local data in the file and the size of the local data. Further steps may include aggregating the collected local data information according to the name of the file in which the local data is contained and merging the aggregated local data information according to the offset of the local data in the file. The method may also include selecting local data information meeting a prefetch condition from the merged local data information as prefetch data information and acquiring corresponding local data according to the selected prefetch data information.

In a fourth possible embodiment provided on the basis of the third possible embodiment, after the selecting local data information meeting a prefetch condition from the merged local data information as prefetch data information, the method may further include storing the selected prefetch data information according to information of the application and loading the acquired local data. Loading the acquired data may further include acquiring the prefetch data information according to the information of the application, acquiring corresponding local data according to the prefetch data information, and loading the acquired local data into a memory.

In a fifth possible embodiment provided on the basis of the first possible embodiment, the second possible embodiment, the third possible embodiment or the fourth possible embodiment, before the loading the acquired local data, the method may further include outputting an application list, and prompting a user to select an application for which running speed is to be improved from the application list. The method may further include the steps of receiving, according to the application selected by the user from the application list, an instruction to improve the running speed of the application and the information of the selected application.

By collecting the local data information corresponding to the missing-page interruption while the application is running and loading the acquired local data according to the local data information, the computer readable storage medium provided by this embodiment may reduce the time spent by the application on accessing I/O operations. Thus, the running speed of the application may be improved. In addition, the effect of speed improvement can be enhanced since the local data information corresponding to the missing-page interruption is not limited to the access scenario of the local data. Further, since the local data information corresponding to the missing-page interruption while different applications are running is different, there may be different speed optimization degrees for different applications. Thus, the pertinence of speed optimization may be improved and the speed optimization space may be expanded.

Sixth embodiment

This embodiment of the invention provides a graphic user interface at a terminal The terminal may include a touch-screen display, a memory and one or more processors configured to perform one or more programs. The graphic user interface may perform at least the following operations. The touch-screen display may be used to display collected local data information corresponding to a missing-page interruption during execution of an application. The local data information may include a name of a file in which local data is contained, an offset of the local data in the file and the size of the local data. The terminal may also acquire local data corresponding to the collected local data information, and load the acquired local data after an instruction to improve the running speed of the application is received.

By collecting the local data information corresponding to the missing-page interruption while the application is executing and loading the acquired local data according to the local data information, the graphic user interface may reduce the time spent by the application on accessing I/O operations. Thus, the running speed of the application may be improved. In addition, the effect of speed improvement may be enhanced since the local data information corresponding to the missing-page interruption may not be limited to the access scenario of the local data. Also, since the local data information corresponding to the missing-page interruption while different applications are running may be different, different speed optimization degrees for different applications may be achieved. Thus, the pertinence of speed optimization may be improved and the speed optimization space may be expanded.

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit. In addition, the device and the terminal for improving the running speed of an application provided by the above embodiments have the same concept as the embodiment of the method for improving the running speed of an application. Therefore, the implementation thereof is not repeated here.

Sequence numbers of the above embodiments of the invention are only used for description, and do not intend to represent superiority or inferiority of the embodiments.

It should be understood by those skilled in the art that all or a part of steps in the above embodiments may be implemented by hardware, and may also be achieved by instructing related hardware with a program. The program may be stored in a computer readable storage medium, and the storage medium mentioned above may be a read-only memory, a magnetic disk, an optical disk or the like.

The terms "first", "second", "third", "fourth" and so on (if exists) in the description, claims and the appended drawings of the invention are used to distinguish similar objects from each other, and are not necessarily used to describe any precedence relation among the terms.

The above embodiments are illustration and description, and should not be considered as limiting embodiments. Any alternations, equivalents, modification and so forth made within the spirit and principle of the present disclosure will fall within the scope of protection of the disclosure.

What is claimed is:

1. A method for improving running speed of an application, comprising:
    running an application stored in a terminal;
    collecting local data information corresponding to a missing-page interruption of running the application, wherein the local data information comprises a name of a file in which local data is contained, an offset of the local data in the file and a size of the local data; and
    acquiring the local data according to the local data information, and loading the local data after an instruction to improve the running speed of the application is acquired;
    wherein the acquiring the local data according to the local data information comprises:
    parsing the local data information to obtain the name of the file in which the local data is contained, the offset of the local data in the file and the size of the local data;
    aggregating the local data information according to the name of the file in which the local data is contained;
    merging the aggregated local data information if a distance between offsets of the local data information is within a preset range, and selecting local data information meeting a prefetch condition from the merged local data information as prefetch data information; and
    acquiring the local data according to the selected prefetch data information.

2. The method according to claim 1, wherein the collecting local data information corresponding to a missing-page interruption of running the application comprises:
    collecting a hard missing-page event and a soft missing-page event while the application is running by an event tracing mechanism, and acquiring local data information corresponding to a missing-page interruption while the application is running from an event tracing log recording the hard missing-page event and the soft missing-page event;
    or, monitoring system underlying call by a HOOK technology, acquiring a monitoring code for recording local data information corresponding to a missing-page interruption, and acquiring, according to the monitoring code, the local data information corresponding to the missing-page interruption while the application is running.

3. The method according to claim 1, wherein after the selecting local data information meeting a prefetch condition from the merged local data information as prefetch data information, the method further comprises:
    storing the selected prefetch data information according to information of the application; and
    the loading the acquired local data comprises:
    acquiring the prefetch data information according to the information of the application, acquiring the local data according to the prefetch data information, and loading the acquired local data into a memory.

4. The method according to claim 1, wherein before the loading the acquired local data, the method further comprises:
    outputting an application list, and prompting a user to select an application for which running speed is to be improved from the application list; and
    receiving, according to the application selected by the user from the application list, an instruction to improve the running speed of the application and the information of the application.

5. A terminal, comprising: one or more processors, a memory, and one or more programs, wherein the one or more programs are stored in the memory and are performed by the one or more processors, and the one or more programs comprise an instruction to perform the following operations:

collecting local data information corresponding to a missing-page interruption of running an application, wherein the local data information comprises a name of a file in which local data is contained, an offset of the local data in the file and a size of the local data;

parsing the local data information to obtain the name of the file in which the local data is contained, the offset of the local data in the file and the size of the local data;

aggregating the local data information according to the name of the file in which the local data is contained;

merging the aggregated local data information if a distance between offsets of the local data information is within a preset range, and selecting local data information meeting a prefetch condition from the merged local data information as prefetch data information; and acquiring corresponding local data according to the local data information, and loading the local data after an instruction to improve the running speed of the application is acquired.

6. The terminal according to claim 5, wherein the one or more programs comprise instructions to perform the following operations:

collecting a hard missing-page event and a soft missing-page event while an application is running by an event tracing mechanism, and acquiring local data information corresponding to a missing-page interruption while the application is running from an event tracing log recording the hard missing-page event and the soft missing-page event;

or, monitoring system underlying call by a HOOK technology, acquiring a monitoring code for recording local data information corresponding to a missing-page interruption, and acquiring, according to the monitoring code, the local data information corresponding to the missing-page interruption while an application is running.

7. The terminal according to claim 5, wherein the one or more programs comprise instructions to perform the following operations:

storing the selected prefetch data information according to information of the application; and the loading the acquired local data comprises:

acquiring the prefetch data information according to the information of the application, acquiring corresponding local data according to the prefetch data information, and loading the acquired local data into a memory.

8. The terminal according to claim 5, wherein the one or more programs comprise instructions to perform the following operations:

outputting an application list, and prompting a user to select an application for which running speed is to be improved from the application list; and receiving, according to the application selected by the user from the application list, an instruction to improve the running speed of the application and the information of the application.

9. A non-transitory computer readable storage medium, wherein the computer readable storage medium stores one or more programs, the one or more programs are executed by one or more processors to perform a slide control method, and the slide control method comprises:

collecting local data information corresponding to a missing-page interruption of running an application, wherein the local data information comprises a name of a file in which local data is contained, an offset of the local data in the file and a size of the local data;

parsing the local data information to obtain the name of the file in which the local data is contained, the offset of the local data in the file and the size of the local data;

aggregating the local data information according to the name of the file in which the local data is contained;

merging the aggregated local data information if a distance between offsets of the local data information is within a preset range, and selecting local data information meeting a prefetch condition from the merged local data information as prefetch data information; and acquiring corresponding local data according to the local data information, and loading the acquired local data after an instruction to improve the running speed of the application is acquired.

10. The computer readable storage medium according to claim 9, wherein the collecting local data information corresponding to a missing-page interruption while an application is running comprises:

collecting a hard missing-page event and a soft missing-page event while an application is running by an event tracing mechanism, and acquiring local data information corresponding to a missing-page interruption while the application is running from an event tracing log recording the hard missing-page event and the soft missing-page event;

or, monitoring system underlying call by a HOOK technology, acquiring a monitoring code for recording local data information corresponding to a missing-page interruption, and acquiring, according to the monitoring code, the local data information corresponding to the missing-page interruption while an application is running.

11. The computer readable storage medium according to claim 9, wherein after the selecting local data information meeting a prefetch condition from the merged local data information as prefetch data information, the method further comprises:

storing the selected prefetch data information according to information of the application; and the loading the acquired local data comprises:

acquiring the prefetch data information according to the information of the application, acquiring corresponding local data according to the prefetch data information, and loading the acquired local data into a memory.

12. The computer readable storage medium according to claim 9, wherein before the loading the acquired local data, the method further comprises:

outputting an application list, and prompting a user to select an application for which running speed is to be improved from the application list; and receiving, according to the application selected by the user from the application list, an instruction to improve the running speed of the application and the information of the application.

* * * * *